(12) United States Patent
Chao

(10) Patent No.: US 12,479,020 B2
(45) Date of Patent: Nov. 25, 2025

(54) METHOD FOR MANUFACTURING REINFORCEMENT BAR OF VEHICLE BUMPER

(71) Applicant: SA. TAI-H INDUSTRIAL CO., LTD., Kaohsiung (TW)

(72) Inventor: Chun Lung Chao, Kaohsiung (TW)

(73) Assignee: SA. TAI-H INDUSTRIAL CO., LTD., Kaohsiung (TW)

(*) Notice: Subject to any disclaimer, the term of this patent is extended or adjusted under 35 U.S.C. 154(b) by 0 days.

(21) Appl. No.: 18/623,077

(22) Filed: Apr. 1, 2024

(65) Prior Publication Data
US 2024/0351091 A1    Oct. 24, 2024

(30) Foreign Application Priority Data
Apr. 24, 2023    (TW) .................................. 112115148

(51) Int. Cl.
*B21D 53/88*   (2006.01)
*B60R 19/02*   (2006.01)

(52) U.S. Cl.
CPC ............ *B21D 53/88* (2013.01); *B60R 19/023* (2013.01)

(58) Field of Classification Search
CPC ..... B21C 37/065; B21C 37/151; B21D 13/10; B21D 15/02; B21D 53/88; B21D 11/10
See application file for complete search history.

(56) References Cited

U.S. PATENT DOCUMENTS

| 10,703,312 B2 | 7/2020 | Johnson et al. |
| 11,427,144 B2 | 8/2022 | Aas et al. |
| 2005/0162631 A1 | 7/2005 | Graber |

(Continued)

FOREIGN PATENT DOCUMENTS

| CN | 102390335 A | 3/2012 |
| CN | 103221266 A | 7/2013 |

(Continued)

OTHER PUBLICATIONS

Office Action with search report dated Nov. 24, 2023 for counterpart Taiwan application No. 112115148.

(Continued)

*Primary Examiner* — Christopher J. Besler
(74) *Attorney, Agent, or Firm* — WPAT, PC

(57) ABSTRACT

A method for manufacturing a reinforcement bar of a vehicle bumper is disclosed. The method includes: (a) providing a metal plate including a first portion, a first connecting section, a second portion, a second connecting section and an intermediate portion, wherein the first connecting section connects the first portion and the intermediate portion, and the second connecting section connects the second portion and the intermediate portion; (b) bending the first connecting section, the second connecting section and the first portion, wherein the first portion is curved; (c) releasing an external force acting on the first portion, so that the first portion springs back; (d) bending the first portion and the second portion; and (e) attaching the section of the first portion to the first surface of the intermediate portion, and attaching the section of the second portion to the second surface of the intermediate portion.

10 Claims, 14 Drawing Sheets

(56) References Cited

U.S. PATENT DOCUMENTS

| | | | |
|---|---|---|---|
| 2014/0033791 A1* | 2/2014 | Johnson | B21D 5/086 |
| | | | 72/227 |
| 2017/0066036 A1* | 3/2017 | Brüggenbrock | B21D 5/06 |
| 2019/0366960 A1* | 12/2019 | Brun | B60R 19/18 |
| 2021/0053517 A1 | 2/2021 | Baas et al. | |

FOREIGN PATENT DOCUMENTS

| | | |
|---|---|---|
| CN | 104148539 A | 11/2014 |
| CN | 113329826 A | 8/2021 |
| DE | 10044409 B4 | 8/2006 |
| TW | 202239493 A | 10/2022 |
| WO | WO02/064277 A1 | 8/2002 |

OTHER PUBLICATIONS

Search Report dated Nov. 24, 2023 (EN) for counterpart Taiwan application No. 112115148.
Taiwan Patent Office "Office Action" issued on Jan. 15, 2025, Taiwan.
Taiwan Patent Office "Search Report" issued on Jan. 15, 2025, Taiwan.

\* cited by examiner

METHOD FOR MANUFACTURING REINFORCEMENT BAR OF VEHICLE BUMPER

BACKGROUND

1. Field of the Disclosure

The disclosure relates to a manufacturing method, in particular, to a method for manufacturing a reinforcement bar of a vehicle bumper.

2. Description of the Related Art

In the vehicle structure, the bumper is one of the important components as it absorbs the impact force during collisions to maintain the overall structure of the vehicle and protect the safety of passengers. The bumper usually includes a plastic shell, which has low rigidity and mainly serves an aesthetic function, with limited ability to absorb impact forces. Therefore, an internal bar (also known as "reinforcement bar" or "reinforcement beam") needs to be added inside the bumper to enhance its buffering function. This internal bar may be a metal frame or metal beam that is processed from a metal material with high tensile strength, which provides high rigidity and can achieve the aforementioned impact absorption effect. In the current manufacturing process, the internal bar is usually formed into a one-piece structure from a sheet metal plate through multiple bending steps and at least one welding step. Therefore, how to effectively bend the metal plate is one of the critical issues.

SUMMARY

According to one embodiment of the disclosure, a method for manufacturing a reinforcement bar of a vehicle bumper includes: (a) providing a metal plate, wherein the metal plate includes a first portion, a first connecting section, a second portion, a second connecting section and an intermediate portion, wherein the first connecting section connects the first portion and the intermediate portion, and the second connecting section connects the second portion and the intermediate portion; (b) bending the first connecting section, the second connecting section and the first portion, wherein the first portion is curved and has a first radius of curvature; (c) releasing an external force acting on the first portion, so that the first portion springs back; (d) bending the first portion and the second portion so that a section of the first portion is adjacent to a first surface of the intermediate portion, and a section of the second portion is adjacent to a second surface of the intermediate portion; and (e) attaching the section of the first portion to the first surface of the intermediate portion, and attaching the section of the second portion to the second surface of the intermediate portion.

BRIEF DESCRIPTION OF THE DRAWINGS

Various aspects of the disclosure are best understood from the following description when read with the accompanying drawings. It should be noted that, the various features are not drawn to scale in accordance with standard practice in the industry.

DETAILED DESCRIPTION

The components, values, operations, materials and configurations in the following disclosure are merely embodiments or examples and are not intended to be limiting. For example, a first element being formed over or on a second element may include different implementations. The first element and the second element may be in direct contact. Alternatively, the first element and the second element may not be in direct contact, and an additional element between the first element and the second element may be included.

FIG. 1 through FIG. 13 illustrate an example of a method for manufacturing a reinforcement bar of a vehicle bumper according to some embodiments of the present disclosure. In some embodiments, the method is for manufacturing a reinforcement bar 7 of a vehicle bumper shown in FIG. 14. The reinforcement bar 7 of a vehicle bumper may be also referred to as "a reinforcement beam 7 of a vehicle bumper".

Figure 1:
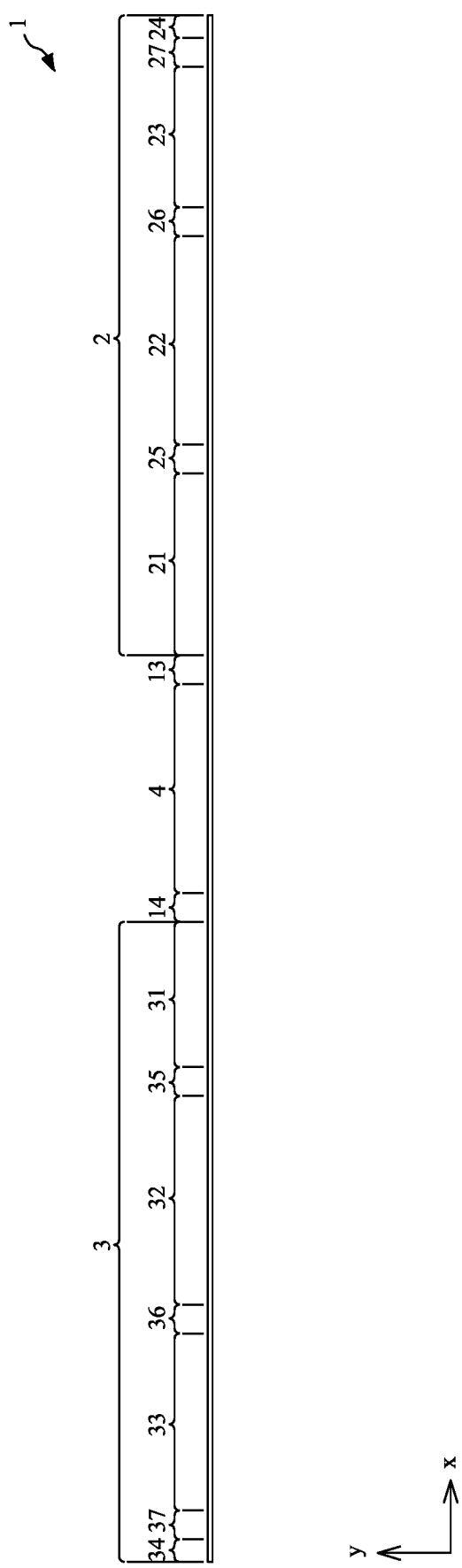
FIG. 1 illustrates one or more stages of an example of a method for manufacturing a reinforcement bar of a vehicle bumper according to some embodiments of the present disclosure.

Referring to FIG. 1, a metal plate 1 (or a metal sheet) is provided. The metal plate 1 is a sheet structure. A material of the metal plate 1 may include non-galvanized steel, such as high strength steel (HSS), advanced high strength steel (AHSS), ultra high strength steel (UHSS), cold rolled steel, hot rolled steel and low carbon steel. In one embodiment, if the material of the metal plate 1 is high strength steel (HSS), advanced high strength steel (AHSS), or ultra high strength steel (UHSS), a tensile strength of the metal plate 1 is about 440 MPa to 2000 MPa (i.e., 63 ksi to 290 ksi). For example, if the material of the metal plate 1 is high strength steel (HSS), the tensile strength of the metal plate 1 is about 440 MPa to 980 MPa. For example, if the material of the metal plate 1 is advanced high strength steel (AHSS), the tensile strength of the metal plate 1 is about 1200 MPa to 1300 MPa. For example, if the material of the metal plate 1 is ultra high strength steel (UHSS), the tensile strength of the metal plate 1 is greater than 1500 MPa. In addition, if the material of the metal plate 1 is cold rolled steel, hot rolled steel or low carbon steel, a tensile strength of the metal plate 1 is about 100 MPa to 430 MPa (i.e., 14 ksi to 62 ksi).

As shown in FIG. 1, in a cross-sectional view, the metal plate 1 extends along a first direction (such as x-direction in FIG. 1). In addition, there may be a second direction (such as y-direction) in FIG. 1. The second direction (e.g., y-direction) is substantially perpendicular to the first direction (e.g., x-direction). The metal plate 1 may include a first portion 2, a first connecting section 13, a second portion 3, a second connecting section 14, and an intermediate portion 4. The first connecting section 13 connects the first portion 2 and the intermediate portion 4. The second connecting section 14 connects the second portion 3 and the intermediate portion 4. The intermediate portion 4 may be located between the first portion 2 and the second portion 3. In one embodiment, a length of the first portion 2 is about 140 mm to 160 mm. A length of the first connecting section 13 is about 6 mm to 8 mm. A length of the second portion 3 is about 140 mm to 160 mm. A length of the second connecting section 14 is about 6 mm to 8 mm. A length of the intermediate portion 4 is about 50 mm to 60 mm. The length of the first portion 2 may be equal to or different from the length of the second portion 3. The length of the first connecting section 13 is substantially equal to the length of the second connecting section 14. A thickness of the metal plate 1 is about 0.8 mm to 4.0 mm.

The first portion 2 may include a first plate section 21, a third connecting section 25, a second plate section 22, a fourth connecting section 26, a third plate section 23, a fifth connecting section 27 and a first end section 24. The first plate section 21 connects to the intermediate portion 4 through the first connecting section 13. In one embodiment, a length of the first plate section 21 is about 40 mm to 48 mm. A length of the third connecting section 25 is about 6 mm to 8 mm. A length of the second plate section 22 is about 50 mm to 58 mm. A length of the fourth connecting section 26 is about 6 mm to 8 mm. A length of the third plate section 23 is about 34 mm to 40 mm. A length of the fifth connecting section 27 is about 6 mm to 8 mm. A length of the first end section 24 is about 4 mm to 10 mm, or about 5 mm to 7 mm. In one embodiment, the length of the first connecting section 13, the length of the third connecting section 25, the length of the fourth connecting section 26 and the length of the fifth connecting section 27 may be equal to each other. The length of the first end section 24 may be less than the length of the fifth connecting section 27.

The second portion 3 may include a fourth plate section 31, a sixth connecting section 35, a fifth plate section 32, a seventh connecting section 36, a sixth plate section 33, an eighth connecting section 37 and a second end section 34. The fourth plate section 31 connects to the intermediate portion 4 through the second connecting section 14. In one embodiment, a length of the fourth plate section 31 is about 33 mm to 40 mm. A length of the sixth connecting section 35 is about 6 mm to 8 mm. A length of the fifth plate section 32 is about 50 mm to 58 mm. A length of the seventh connecting section 36 is about 6 mm to 8 mm. A length of the sixth plate section 33 is about 40 mm to 46 mm. A length of the eighth connecting section 37 is about 6 mm to 8 mm. A length of the second end section 34 is about 4 mm to 10 mm, or about 5 mm to 7 mm. In one embodiment, the length of the second connecting section 14, the length of the sixth connecting section 35, the length of the seventh connecting section 36 and the length of the eighth connecting section 37 may be equal to each other. The length of the second end section 34 may be less than the length of the eighth connecting section 37.

Then, a roll forming machine (not shown) is provided. The roll forming machine includes a plurality sets (or series) of forming rollers.

Figure 2:
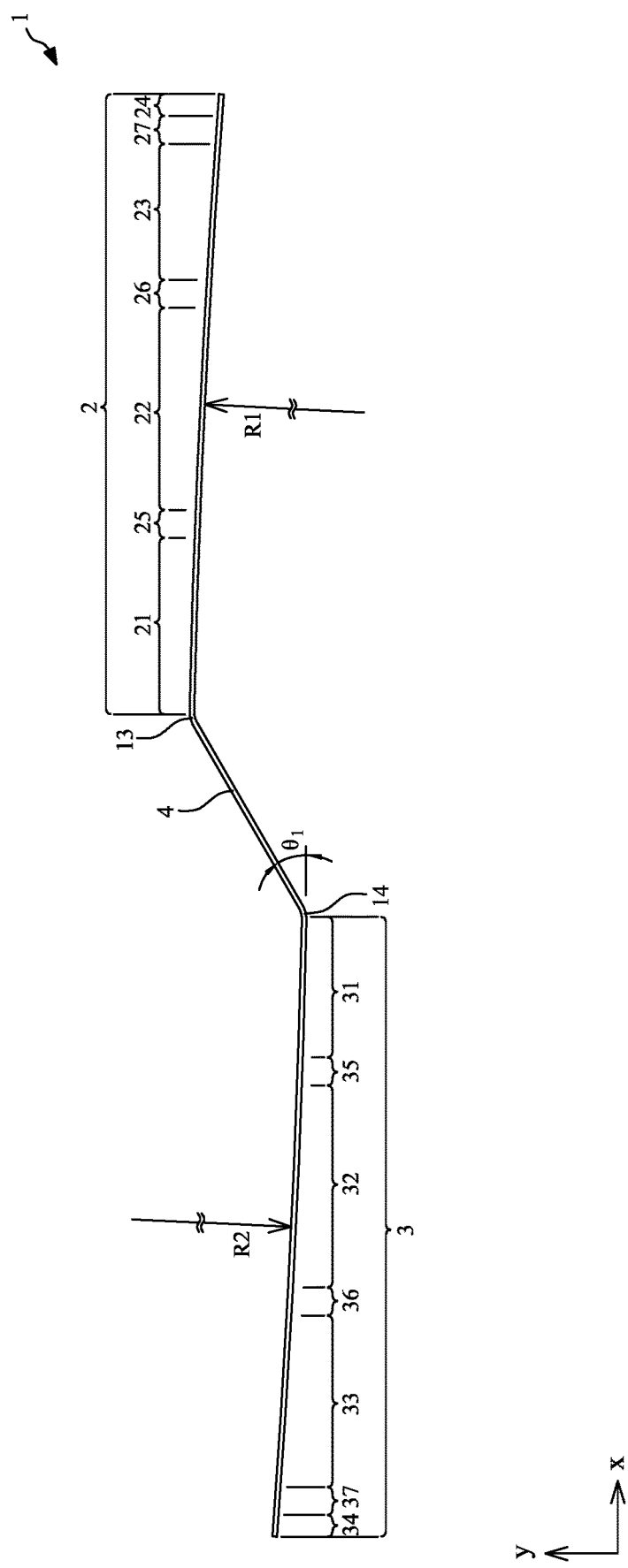
FIG. 2 illustrates one or more stages of an example of a method for manufacturing a reinforcement bar of a vehicle bumper according to some embodiments of the present disclosure.

Referring to FIG. 2, the metal plate 1 is fed to pass through a first set (or a first series) of the forming rollers of the roll forming machine, so as to perform a roll forming process, and form a shape. Thus, the metal plate 1 is rolled formed by the first set (or the first series) of the forming rollers. During the roll forming process, the first connecting section 13, the second connecting section 14, the first portion 2 and the second portion 3 are bent concurrently. Meanwhile, the intermediate portion 4 and the second portion 3 are disposed under the first portion 2, or are on a lower side of the first portion 2. The intermediate portion 4 and the first portion 2 are disposed over the second portion 3, or are on an upper side of the second portion 3. The first connecting section 13 is curved, and has a curvature and a radius of curvature. The second connecting section 14 is curved, and has a curvature and a radius of curvature. The first portion 2 is curved, and has a first curvature and a first radius of curvature R1. Thus, the first portion 2 is non-parallel with the second portion 3, the intermediate portion 4 and the first direction (e.g., x-direction). In one embodiment, the first radius of curvature R1 of the first portion 2 is about 2000 mm to 4000 mm. For example, the first radius of curvature R1 of the first portion 2 may be 15 to 30 times, 20 to 40 times or 20 to 30 times the length of the first portion 2. In one embodiment, the radius of curvature of the first connecting section 13 and the radius of curvature of the second connecting section 14 may be less than the first radius of curvature R1 of the first portion 2. In one embodiment, the curvature of the first connecting section 13 may be continuous with the first curvature of the first portion 2. In one embodiment, the first portion 2 is bent downward. Thus, a center of curvature of the first portion 2 is disposed under the first portion 2, or is on a lower side of the first portion 2. That is, the center of curvature of the first portion 2 is located at a position, and such position and the intermediate portion 4 are on a same side with respect to the first portion 2. The center of curvature of the first portion 2 is located at a position that is on a same side with the intermediate portion 4. In another embodiment, the first portion 2 is bent upward. Thus, the center of curvature of the first portion 2 is disposed over the first portion 2, or is on an upper side of the first portion 2. That is, the center of curvature of the first portion 2 is located at a position, and such position and the intermediate portion 4 are on opposite sides with respect to the first portion 2. The center of curvature of the first portion 2 is located at a position that is on an opposite side with the intermediate portion 4. The position of the center of curvature of the first portion 2 is far away from the intermediate portion 4.

Similarly, the second portion 3 is curved, and has a second curvature and a second radius of curvature R2. Thus, the second portion 3 is non-parallel with the first portion 2, the intermediate portion 4 and the first direction (e.g., x-direction). In one embodiment, the second radius of curvature R2 of the second portion 3 is about 2000 mm to 4000 mm. For example, the second radius of curvature R2 of the second portion 3 may be 15 to 30 times, 20 to 40 times or 20 to 30 times the length of the second portion 3. In one embodiment, the radius of curvature of the first connecting section 13 and the radius of curvature of the second connecting section 14 may be less than the second radius of curvature R2 of the second portion 3. In one embodiment, the curvature of the second connecting section 14 may be continuous with the second curvature of the second portion 3. In one embodiment, the second portion 3 is bent upward. Thus, the center of curvature of the second portion 3 is disposed over the second portion 3, or is on an upper side of the second portion 3. That is, the center of curvature of the second portion 3 is located at a position, and such position and the intermediate portion 4 are on a same side with respect to the second portion 3. The center of curvature of the second portion 3 is located at a position that is on a same side with the intermediate portion 4. In another embodiment, the second portion 3 is bent downward. Thus, a center of curvature of the second portion 3 is disposed under the second portion 3, or is on a lower side of the second portion 3. That is, the center of curvature of the second portion 3 is located at a position, and such position and the intermediate portion 4 are on opposite sides with respect to the second portion 3. The center of curvature of the second portion 3 is located at a position that is on an opposite side with the intermediate portion 4. The position of the center of curvature of the second portion 3 is far away from the intermediate portion 4.

In one embodiment, the first radius of curvature R1 of the first portion 2 may be equal to or different form the second radius of curvature R2 of the second portion 3. The curved first portion 2 and the curved second portion 3 may be formed concurrently. For example, the curved first portion 2 and the curved second portion 3 may be rolled formed by a same set (or a same series) of the forming rollers concurrently. Alternatively, the curved first portion 2 and the curved second portion 3 may be formed at different manufacturing stages or different manufacturing steps. The curved first portion 2 and the curved second portion 3 may be rolled formed by different sets (or different series) of the forming rollers. In addition, the intermediate portion 4 is flat or even, and is not bent. An inclination angle θ1 between the intermediate portion 4 and the first direction (e.g., x-direction) is about 30 degrees.

Figure 3:
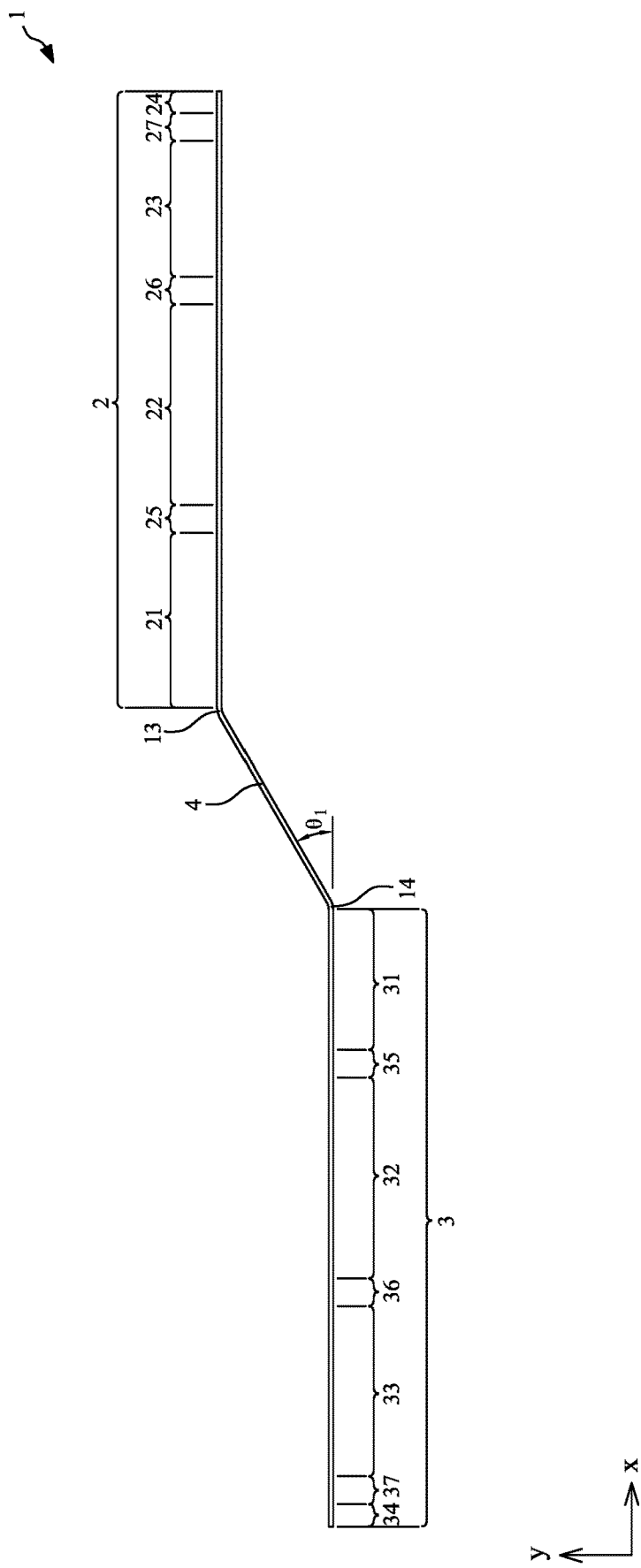
FIG. 3 illustrates one or more stages of an example of a method for manufacturing a reinforcement bar of a vehicle bumper according to some embodiments of the present disclosure.

Referring to FIG. 3, the metal plate 1 leaves the first set of forming rollers, and is left to stand for a period of time (i.e., about 10 seconds to 15 seconds) so as to release an external force acting on the first portion 2 and the second portion 3. Thus, the first portion 2 and the second portion 3 spring back. In one embodiment, the curved first portion 2 and the curved second portion 3 are free to spring back to become a substantially flat condition or even condition. That is, the first portion 2 springs back to a substantially flat shape. The second portion 3 springs back to a substantially flat shape. Thus, the first portion 2 is substantially parallel with the second portion 3. The extending direction of the first portion 2 and the extending direction of the second portion 3 are substantially parallel with the first direction (e.g., x-direction). An inclination angle between the first portion 2 and the intermediate portion 4 is about 150 degrees. An inclination angle between the second portion 3 and the intermediate portion 4 is also about 150 degrees.

Figure 4:
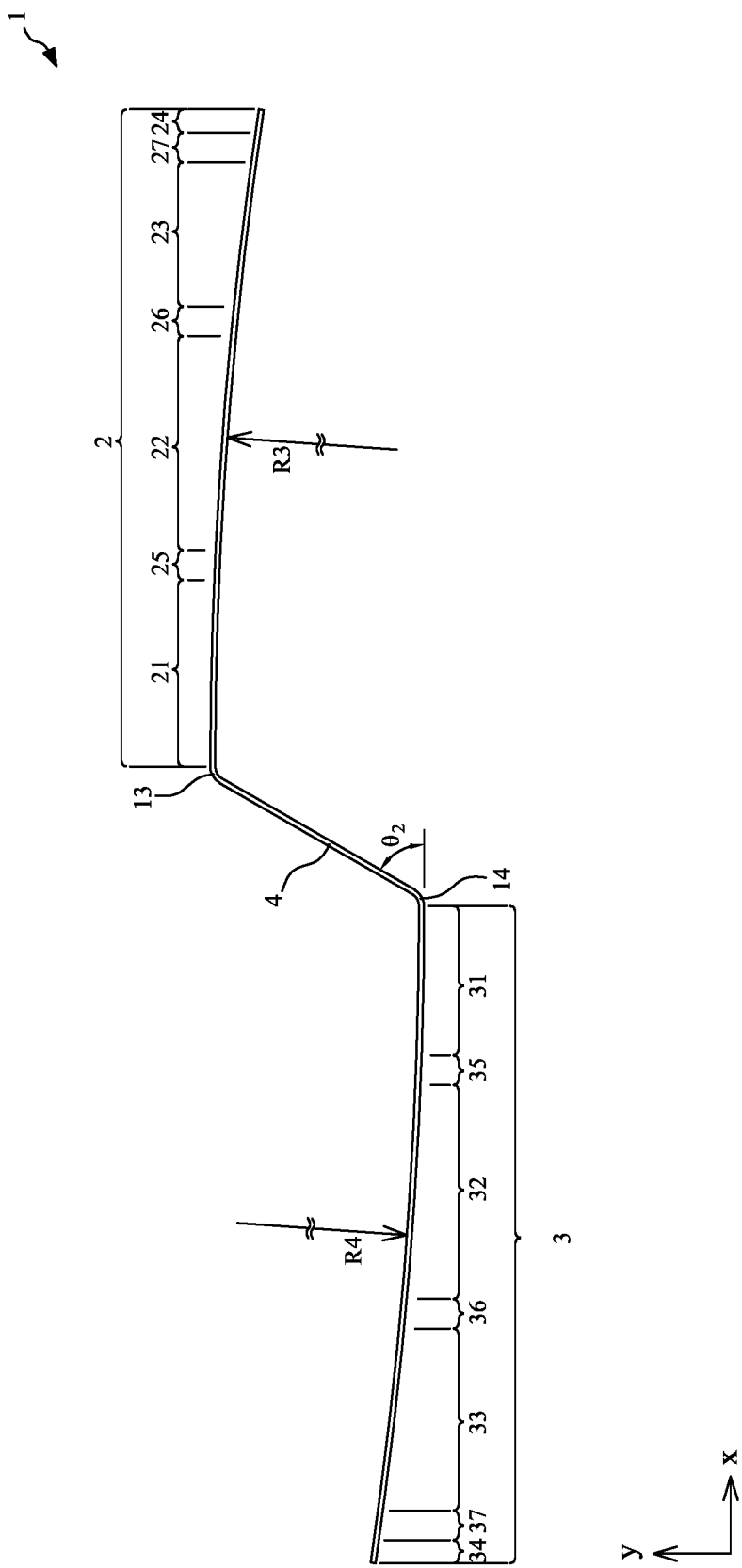
FIG. 4 illustrates one or more stages of an example of a method for manufacturing a reinforcement bar of a vehicle bumper according to some embodiments of the present disclosure.

Referring to FIG. 4, the metal plate 1 is fed to pass through a second set (or a second series) of the forming rollers of the roll forming machine, so as to perform a roll forming process, and form a shape. Thus, the metal plate 1 is rolled formed by the second set (or the second series) of the forming rollers. During the roll forming process, the first connecting section 13, the second connecting section 14, the first portion 2 and the second portion 3 are bent concurrently again. That is, the bending process similar to the bending process of FIG. 2 is repeated. The first portion 2 is bent to be curved again, and has a third curvature and a third radius of curvature R3. Thus, the first portion 2 is non-parallel with the second portion 3, the intermediate portion 4, and the first direction (e.g., x-direction). In one embodiment, the third radius of curvature R3 of the first portion 2 is about 1800 mm to 2800 mm. For example, the third radius of curvature R3 of the first portion 2 may be 10 to 20 times, 15 to 23 times or 13 to 18 times the length of the first portion 2. In one embodiment, the radius of curvature of the first connecting section 13 and the radius of curvature of the second connecting section 14 may be less than the third radius of curvature R3 of the first portion 2. In one embodiment, the curvature of the first connecting section 13 may be continuous with the third curvature of the first portion 2. In one embodiment, the first portion 2 is bent downward. Thus, a center of curvature of the first portion 2 is disposed under the first portion 2, or is on a lower side of the first portion 2. That is, the center of curvature of the first portion 2 is located at a position, and such position and the intermediate portion 4 are on a same side with respect to the first portion 2. The center of curvature of the first portion 2 is located at a position that is on a same side with the intermediate portion 4. In another embodiment, the first portion 2 is bent upward. Thus, the center of curvature of the first portion 2 is disposed over the first portion 2, or is on an upper side of the first portion 2. That is, the center of curvature of the first portion 2 is located at a position, and such position and the intermediate portion 4 are on opposite sides with respect to the first portion 2. The center of curvature of the first portion 2 is located at a position that is on an opposite side with the intermediate portion 4. The position of the center of curvature of the first portion 2 is far away from the intermediate portion 4.

In one embodiment, the third radius of curvature R3 of the first portion 2 may be different from the first radius of curvature R1 of the first portion 2 (FIG. 2). In one embodiment, the third radius of curvature R3 of the first portion 2 may be less than the first radius of curvature R1 of the first portion 2 (FIG. 2).

Similarly, the second portion 3 is bent to be curved again, and has a fourth curvature and a fourth radius of curvature R4. Thus, the second portion 3 is non-parallel with the first portion 2, the intermediate portion 4, and the first direction (e.g., x-direction). In one embodiment, the fourth radius of curvature R4 of the second portion 3 is about 1800 mm to 2800 mm. For example, the fourth radius of curvature R4 of the second portion 3 may be 10 to 20 times, 15 to 12 times or 13 to 18 times the length of the second portion 3. In one embodiment, the radius of curvature of the first connecting section 13 and the radius of curvature of the second connecting section 14 may be less than the fourth radius of curvature R4 of the second portion 3. In one embodiment, the curvature of the second connecting section 14 may be continuous with the fourth curvature of the second portion 3. In one embodiment, the second portion 3 is bent upward. Thus, the center of curvature of the second portion 3 is disposed over the second portion 3, or is on an upper side of the second portion 3. That is, the center of curvature of the second portion 3 is located at a position, and such position and the intermediate portion 4 are on a same side with respect to the second portion 3. The center of curvature of the second portion 3 is located at a position that is on a same side with the intermediate portion 4. In another embodiment, the second portion 3 is bent downward. Thus, a center of curvature of the second portion 3 is disposed under the second portion 3, or is on a lower side of the second portion 3. That is, the center of curvature of the second portion 3 is located at a position, and such position and the intermediate portion 4 are on opposite sides with respect to the second portion 3. The center of curvature of the second portion 3 is located at a position that is on an opposite side with the intermediate portion 4. The position of the center of curvature of the second portion 3 is far away from the intermediate portion 4.

In one embodiment, the fourth radius of curvature R4 of the second portion 3 may be different from the second radius of curvature R2 of the second portion 3 (FIG. 2). In one embodiment, the fourth radius of curvature R4 of the second portion 3 may be less than the second radius of curvature R2 of the second portion 3 (FIG. 2).

In one embodiment, the third radius of curvature R3 of the first portion 2 may be equal to or different form the fourth radius of curvature R4 of the second portion 3. The curved first portion 2 and the curved second portion 3 may be formed concurrently. For example, the curved first portion 2 and the curved second portion 3 may be rolled formed by a same set (or a same series) of the forming rollers concurrently. Alternatively, the curved first portion 2 and the curved second portion 3 may be formed at different manufacturing stages or different manufacturing steps. The curved first portion 2 and the curved second portion 3 may be rolled formed by different sets (or different series) of the forming rollers. In addition, the intermediate portion 4 is flat or even, and is not bent. An inclination angle θ2 between the intermediate portion 4 and the first direction (e.g., x-direction) is about 60 degrees.

Figure 5:
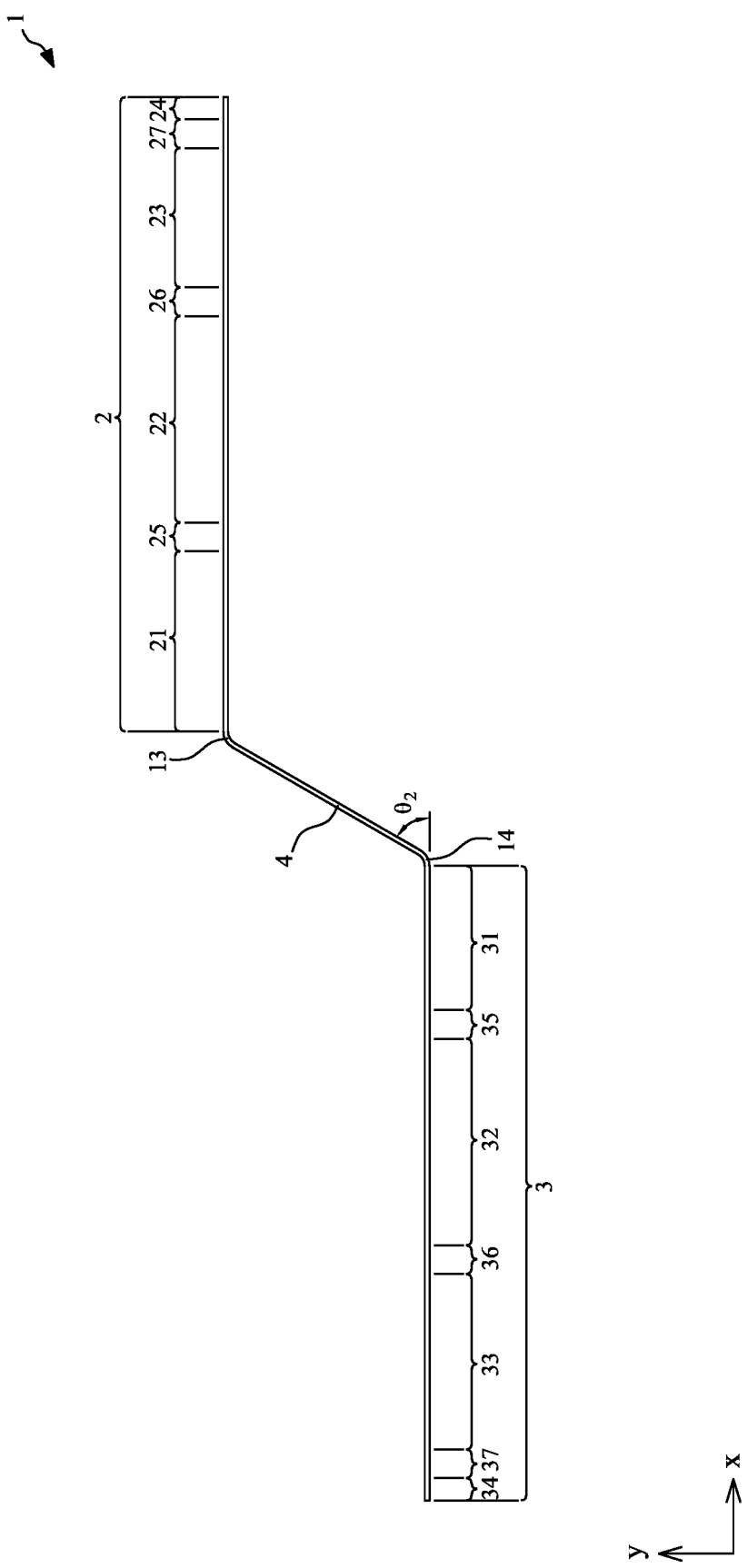
FIG. 5 illustrates one or more stages of an example of a method for manufacturing a reinforcement bar of a vehicle bumper according to some embodiments of the present disclosure.

Referring to FIG. 5, the metal plate 1 leaves the second set of forming rollers, and is left to stand for a period of time (i.e., about 10 seconds to 15 seconds) so as to release an external force acting on the first portion 2 and the second portion 3. Thus, the first portion 2 and the second portion 3 spring back. In one embodiment, the curved first portion 2 and the curved second portion 3 are free to spring back to become a substantially flat condition or even condition. That is, the first portion 2 springs back to a substantially flat shape. The second portion 3 springs back to a substantially flat shape. Thus, the first portion 2 is substantially parallel with the second portion 3. The extending direction of the first portion 2 and the extending direction of the second portion 3 are substantially parallel with the first direction (e.g., x-direction). An inclination angle between the first portion 2 and the intermediate portion 4 is about 120 degrees. An inclination angle between the second portion 3 and the intermediate portion 4 is also about 120 degrees.

Figure 6:
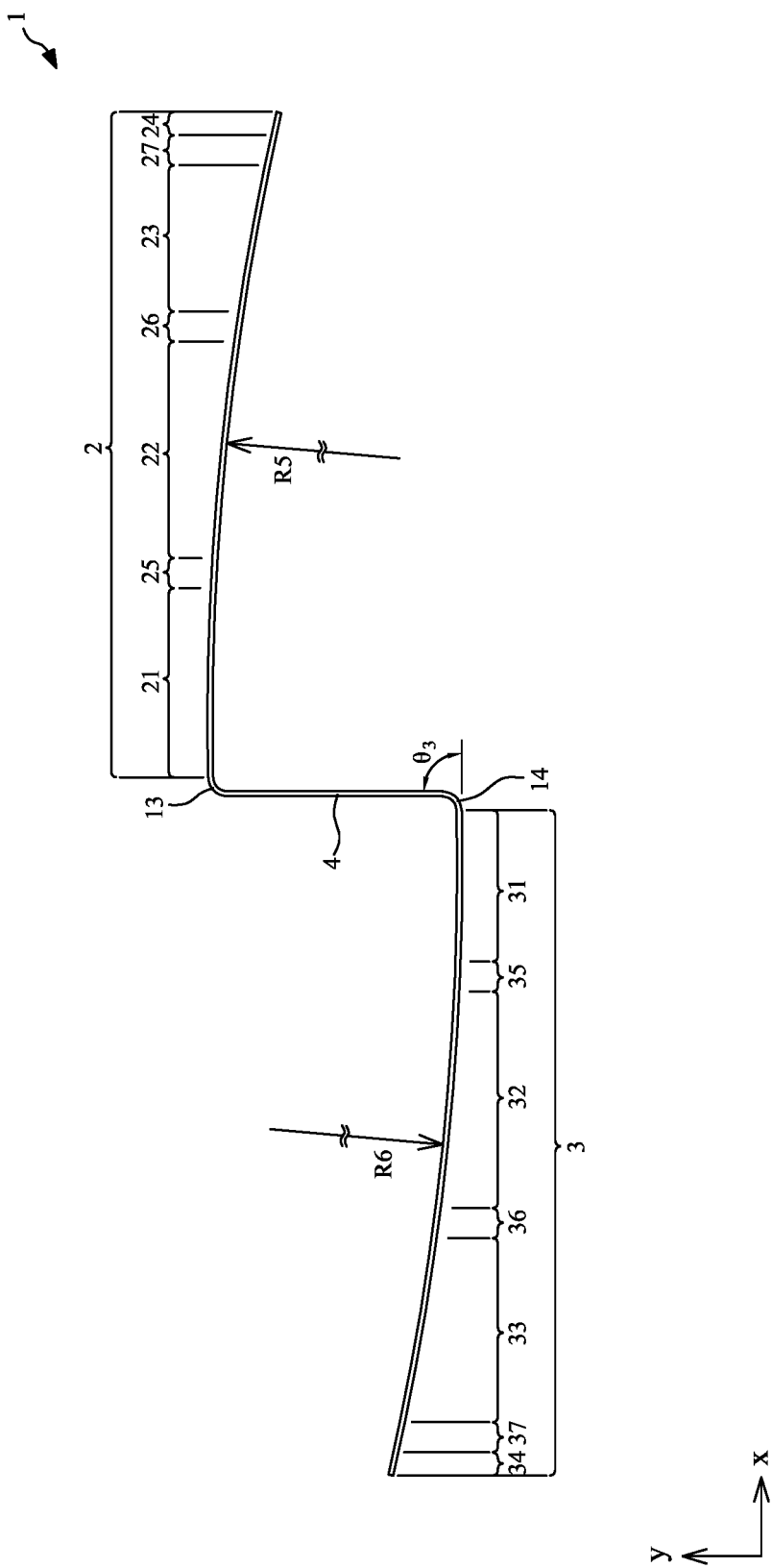
FIG. 6 illustrates one or more stages of an example of a method for manufacturing a reinforcement bar of a vehicle bumper according to some embodiments of the present disclosure.

Referring to FIG. 6, the metal plate 1 is fed to pass through a third set (or a third series) of the forming rollers of the roll forming machine, so as to perform a roll forming process, and form a shape. Thus, the metal plate 1 is rolled formed by the third set (or the third series) of the forming rollers. During the roll forming process, the first connecting section 13, the second connecting section 14, the first portion 2 and the second portion 3 are bent concurrently again. That is, the bending process similar to the bending process of FIG. 2 is repeated. The first portion 2 is bent to be curved again, and has a fifth curvature and a fifth radius of curvature R5. Thus, the first portion 2 is non-parallel with the second portion 3, the intermediate portion 4, and the first direction (e.g., x-direction). In one embodiment, the fifth radius of curvature R5 of the first portion 2 is about 1200 mm to 2200 mm. For example, the fifth radius of curvature R5 of the first portion 2 may be 5 to 15 times, 8 to 13 times or 10 to 15 times the length of the first portion 2. In one embodiment, the radius of curvature of the first connecting section 13 and the radius of curvature of the second connecting section 14 may be less than the fifth radius of curvature R5 of the first portion 2. In one embodiment, the curvature of the first connecting section 13 may be continuous with the fifth curvature of the first portion 2. In one embodiment, the first portion 2 is bent downward. Thus, a center of curvature of the first portion 2 is disposed under the first portion 2, or is on a lower side of the first portion 2. That is, the center of curvature of the first portion 2 is located at a position, and such position and the intermediate portion 4 are on a same side with respect to the first portion 2. The center of curvature of the first portion 2 is located at a position that is on a same side with the intermediate portion 4. In another embodiment, the first portion 2 is bent upward. Thus, the center of curvature of the first portion 2 is disposed over the first portion 2, or is on an upper side of the first portion 2. That is, the center of curvature of the first portion 2 is located at a position, and such position and the intermediate portion 4 are on opposite sides with respect to the first portion 2. The center of curvature of the first portion 2 is located at a position that is on an opposite side with the intermediate portion 4. The position of the center of curvature of the first portion 2 is far away from the intermediate portion 4.

In one embodiment, the fifth radius of curvature R5 of the first portion 2 may be different from the third radius of curvature R3 of the first portion 2 (FIG. 4). In one embodiment, the fifth radius of curvature R5 of the first portion 2 may be less than the third radius of curvature R3 of the first portion 2 (FIG. 4).

Similarly, the second portion 3 is bent to be curved again, and has a sixth curvature and a sixth radius of curvature R6. Thus, the second portion 3 is non-parallel with the first portion 2, the intermediate portion 4, and the first direction (e.g., x-direction). In one embodiment, the sixth radius of curvature R6 of the second portion 3 is about 1200 mm to 2200 mm. For example, the sixth radius of curvature R6 of the second portion 3 may be 5 to 15 times, 8 to 13 times or 10 to 15 times the length of the second portion 3. In one embodiment, the radius of curvature of the first connecting section 13 and the radius of curvature of the second connecting section 14 may be less than the sixth radius of curvature R6 of the second portion 3. In one embodiment, the curvature of the second connecting section 14 may be continuous with the sixth curvature of the second portion 3. In one embodiment, the second portion 3 is bent upward.

Thus, the center of curvature of the second portion 3 is disposed over the second portion 3, or is on an upper side of the second portion 3. That is, the center of curvature of the second portion 3 is located at a position, and such position and the intermediate portion 4 are on a same side with respect to the second portion 3. The center of curvature of the second portion 3 is located at a position that is on a same side with the intermediate portion 4. In another embodiment, the second portion 3 is bent downward. Thus, a center of curvature of the second portion 3 is disposed under the second portion 3, or is on a lower side of the second portion 3. That is, the center of curvature of the second portion 3 is located at a position, and such position and the intermediate portion 4 are on opposite sides with respect to the second portion 3. The center of curvature of the second portion 3 is located at a position that is on an opposite side with the intermediate portion 4. The position of the center of curvature of the second portion 3 is far away from the intermediate portion 4.

In one embodiment, the sixth radius of curvature R6 of the second portion 3 may be different from the fourth radius of curvature R4 of the second portion 3 (FIG. 4). In one embodiment, the sixth radius of curvature R6 of the second portion 3 may be less than the fourth radius of curvature R4 of the second portion 3 (FIG. 4).

In one embodiment, the fifth radius of curvature R5 of the first portion 2 may be equal to or different form the sixth radius of curvature R6 of the second portion 3. The curved first portion 2 and the curved second portion 3 may be formed concurrently. For example, the curved first portion 2 and the curved second portion 3 may be rolled formed by a same set (or a same series) of the forming rollers concurrently. Alternatively, the curved first portion 2 and the curved second portion 3 may be formed at different manufacturing stages or different manufacturing steps. The curved first portion 2 and the curved second portion 3 may be rolled formed by different sets (or different series) of the forming rollers. In addition, the intermediate portion 4 is flat or even, and is not bent. An inclination angle θ3 between the intermediate portion 4 and the first direction (e.g., x-direction) is about 90 degrees.

Figure 7:
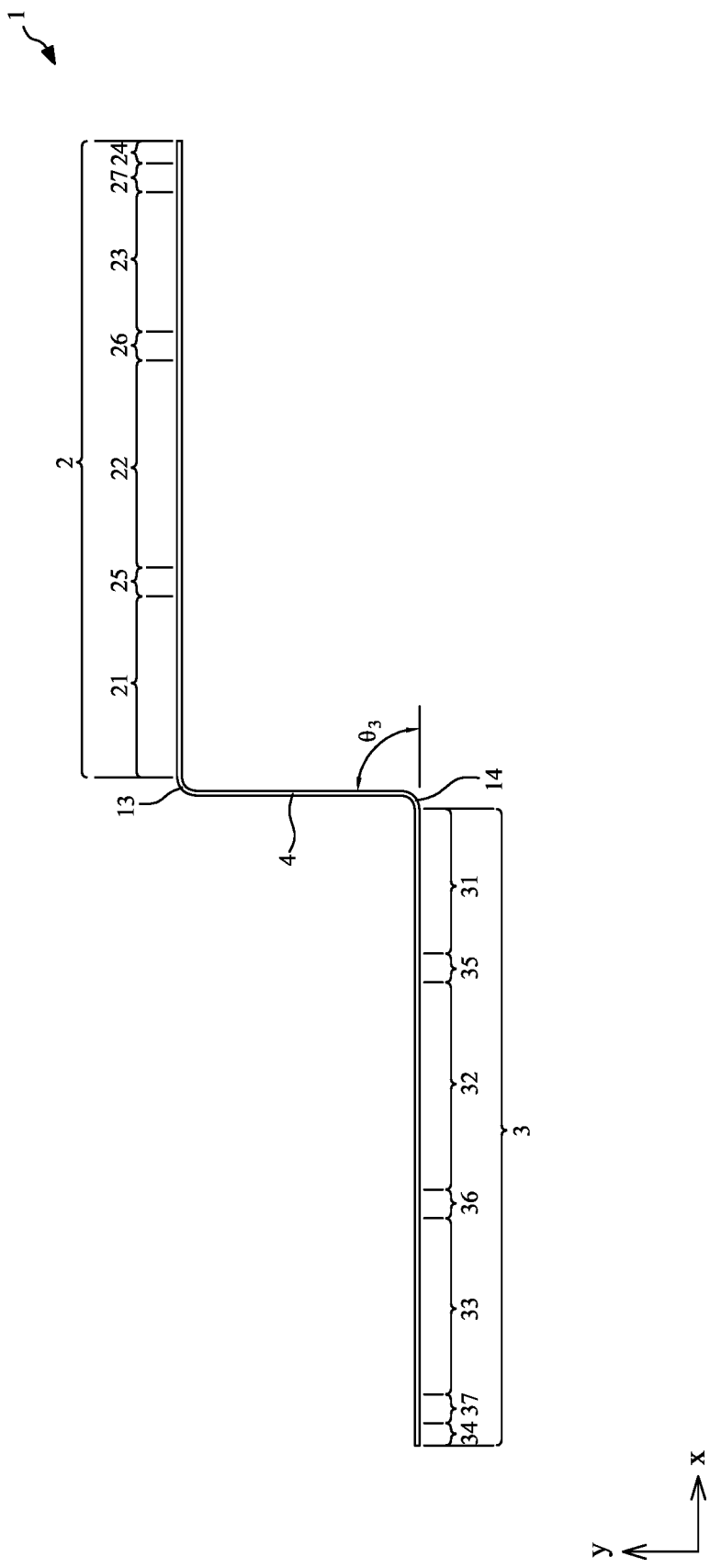
FIG. 7 illustrates one or more stages of an example of a method for manufacturing a reinforcement bar of a vehicle bumper according to some embodiments of the present disclosure.

Referring to FIG. 7, the metal plate 1 leaves the third set of forming rollers, and is left to stand for a period of time (i.e., about 10 seconds to 15 seconds) so as to release an external force acting on the first portion 2 and the second portion 3. Thus, the first portion 2 and the second portion 3 spring back. In one embodiment, the curved first portion 2 and the curved second portion 3 are free to spring back to become a substantially flat condition or even condition. That is, the first portion 2 springs back to a substantially flat shape. The second portion 3 springs back to a substantially flat shape. In the first portion 2, starting from the first plate section 21, passing through the third connecting section 25, the second plate section 22, the fourth connecting section 26, the third plate section 23, the fifth connecting section 27, and ending at the first end section 24, it is a continuous flat plate. All of these sections 21, 25, 22, 26, 23, 27, 24 are flat or aligned with each other, without any sections being bent. Similarly, in the second portion 3, starting from the fourth plate section 31, passing through the sixth connecting section 35, the fifth plate section 32, the seventh connecting section 36, the sixth plate section 33, the eighth connecting section 37, and ending at the second end section 34, it is a continuous flat plate. All of these sections 31, 35, 32, 36, 33, 37, 34 are flat or aligned with each other, without any sections being bent. Thus, the first portion 2 is substantially parallel with the second portion 3. The extending direction of the first portion 2 and the extending direction of the second portion 3 are substantially parallel with the first direction (e.g., x-direction). An inclination angle between the first portion 2 and the intermediate portion 4 is about 90 degrees. An inclination angle between the second portion 3 and the intermediate portion 4 is also about 90 degrees.

In the present disclosure, excessive bending (or over bending) or pre-bending of the first portion 2 and second portion 3 (as shown in FIG. 2, FIG. 4 and FIG. 6) is adopted to compensate for an amount of springback of the first portion 2 and second portion 3 (as shown in FIG. 3, FIG. 5 and FIG. 7). Therefore, in one embodiment, it only requires up to three bending steps (i.e., the metal plate 1 only needs to pass through up to three sets of forming rollers) to bend the metal plate 1 into the shape shown in FIG. 7. The number of processing steps is effectively reduced. That is, in the present disclosure, the first portion 2 and second portion 3 can be bent relatively to the intermediate portion 4 by at least 30 degrees in one bending step (i.e., the metal plate 1 passes through one set of forming rollers).

Furthermore, the excessive bending (or over bending) or pre-bending process can occur or cause elastic fatigue in the first portion 2 and second portion 3, which facilitates the subsequent bending processes on the first portion 2 and second portion 3, reducing the number of processing steps for subsequent bending. As compared with prior art, the method of the present disclosure can effectively reduce the total number of processing steps for the reinforcement bar 7 of the vehicle bumper without changing the material and dimensions of the metal plate 1, thereby effectively reducing the processing cost of the reinforcement bar 7 of the vehicle bumper.

Figure 8:
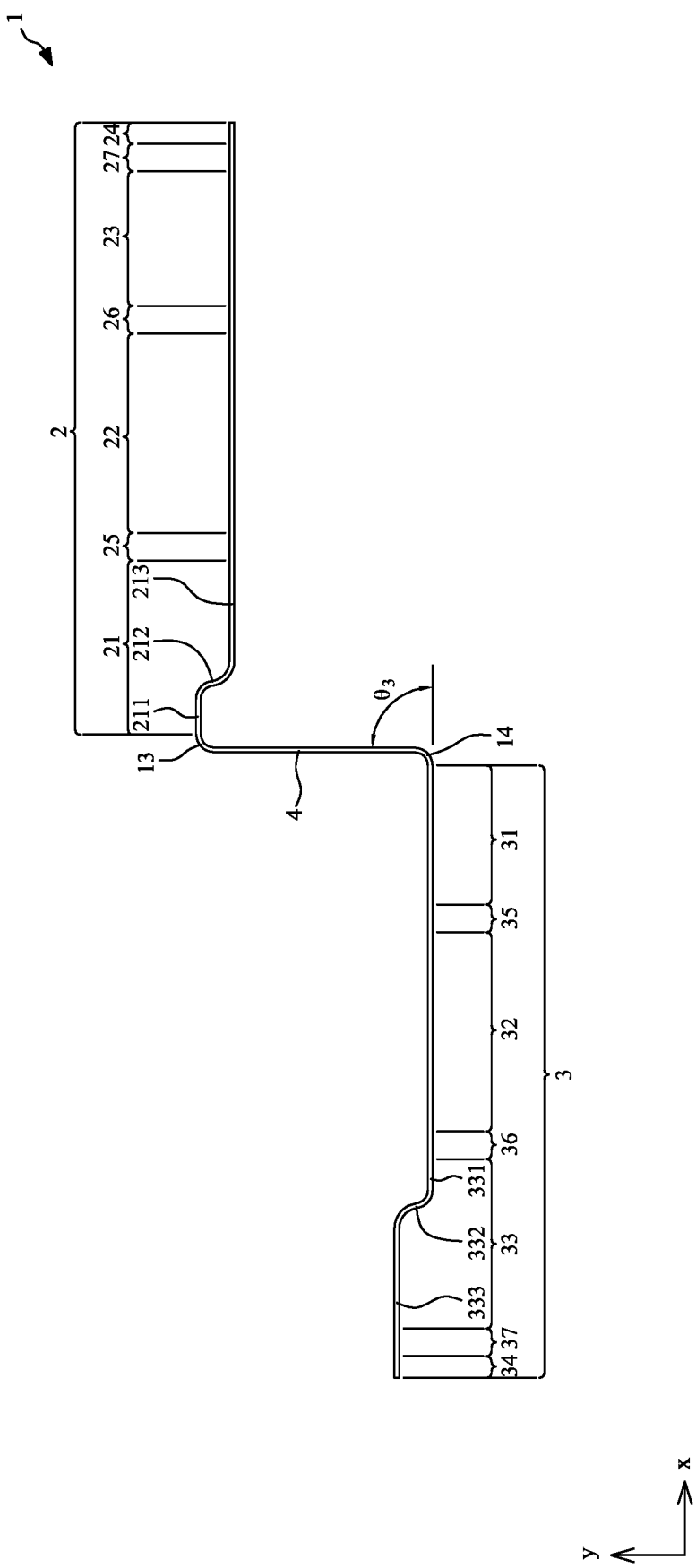
FIG. 8 illustrates one or more stages of an example of a method for manufacturing a reinforcement bar of a vehicle bumper according to some embodiments of the present disclosure.

Then, referring to FIG. 8, the metal plate 1 is fed to pass through another set (or another series) of the forming rollers of the roll forming machine, so as to perform a roll forming process, and form a shape. During the roll forming process, the first plate section 21 is bent to form a step shape or step structure. Meanwhile, the first plate section 21 includes a first subsection 211, a second subsection 212, and a third subsection 213. The second subsection 212 connects the first subsection 211 and the third subsection 213. The first subsection 211 is not aligned with nor level with the third subsection 213. The first subsection 211 is substantially parallel with the third subsection 213, and both are substantially perpendicular to the intermediate portion 4. In the first portion 2, starting from the third subsection 213 of the first plate section 21, passing through the third connecting section 25, the second plate section 22, the fourth connecting section 26, the third plate section 23, the fifth connecting section 27, and ending at the first end section 24, it is a continuous flat plate.

During the roll forming process, the sixth plate section 33 is bent concurrently to form a step shape or step structure. Meanwhile, the sixth plate section 33 includes a first subsection 331, a second subsection 332, and a third subsection 333. The second subsection 332 connects the first subsection 331 and the third subsection 333. The first subsection 331 is not aligned with nor level with the third subsection 333. The first subsection 331 is substantially parallel with the third subsection 333, and both are substantially perpendicular to the intermediate portion 4. In the second portion 3, starting from the fourth plate section 31, passing through the sixth connecting section 35, the fifth plate section 32, the seventh connecting section 36, and ending at the first subsection 331 of the sixth plate section 33, it is a continuous flat plate. In addition, starting from the third subsection 333 of the sixth plate section 33, passing through the eighth connecting section 37, and ending at the second end section 34, it is a continuous flat plate.

Figure 9:
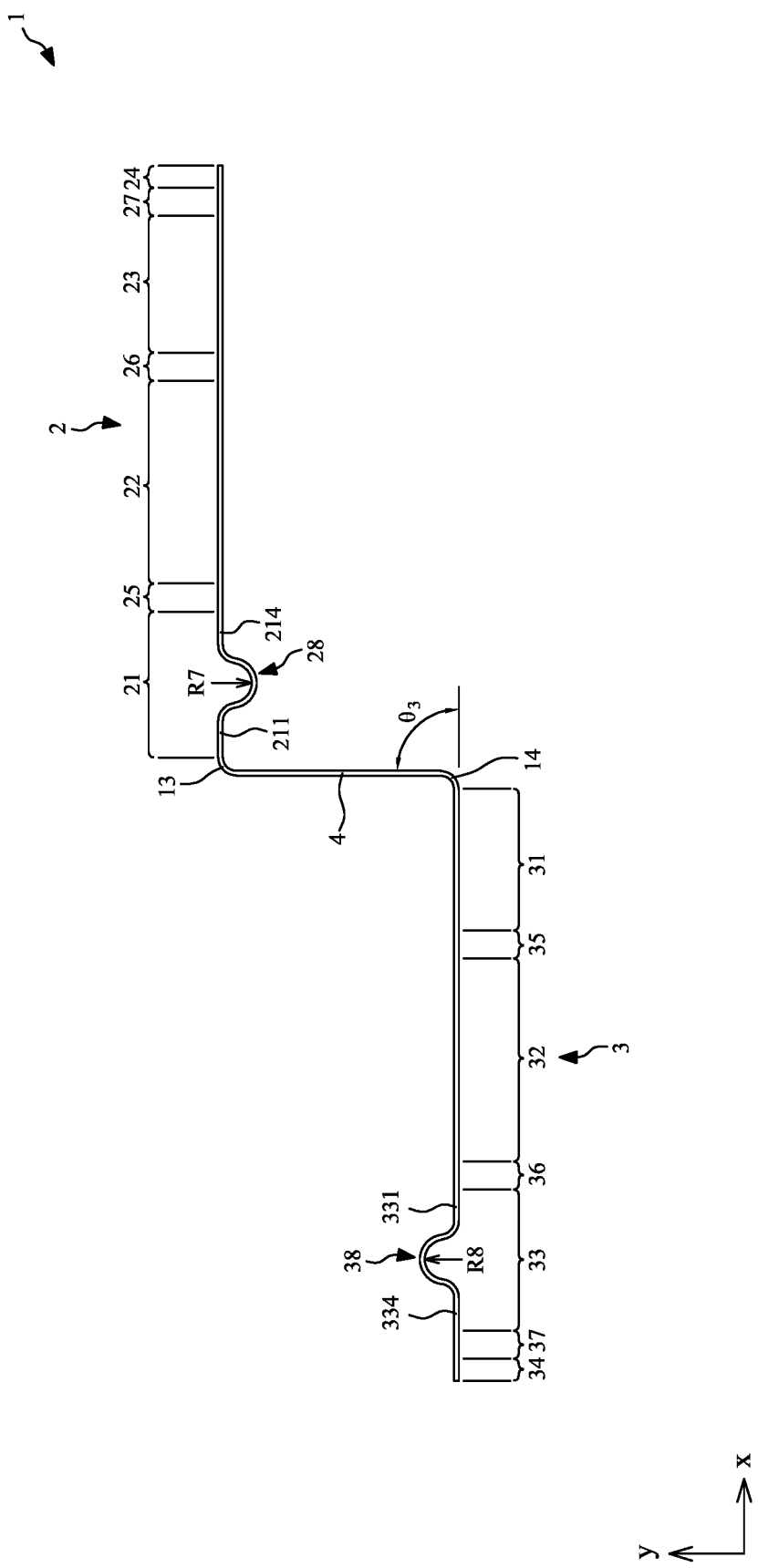
FIG. 9 illustrates one or more stages of an example of a method for manufacturing a reinforcement bar of a vehicle bumper according to some embodiments of the present disclosure.

Then, referring to FIG. 9, the metal plate 1 is fed to pass through another set (or another series) of the forming rollers of the roll forming machine, so as to perform a roll forming process, and form a shape. During the roll forming process, the third subsection 213 of the first plate section 21 is bent. Meanwhile, the first plate section 21 includes a first subsection 211, a first recess portion 28, and a fourth subsection 214. The first recess portion 28 connects the first subsection 211 and the fourth subsection 214. The first subsection 211 is aligned with or level with the fourth subsection 214. In the first portion 2, starting from the fourth subsection 214 of the first plate section 21, passing through the third connecting section 25, the second plate section 22, the fourth connecting section 26, the third plate section 23, the fifth connecting section 27, and ending at the first end section 24, it is a continuous flat plate. In one embodiment, the first recess portion 28 is a semicircle, and has a radius of curvature R7 of about 2 mm to 15 mm, 4 mm to 10 mm, or 5 mm to 7 mm.

During the roll forming process, the third subsection 333 of the sixth plate section 33 is bent concurrently. Meanwhile, the sixth plate section 33 includes a first subsection 331, a second recess portion 38, and a fourth subsection 334. The second recess portion 38 connects the first subsection 331 and the fourth subsection 334. The first subsection 331 is aligned with or level with the fourth subsection 334. The first subsection 331 is substantially parallel with the fourth subsection 334. In the second portion 3, starting from the fourth subsection 334 of the sixth plate section 33, passing through the eighth connecting section 37, and ending at the second end section 34, it is a continuous flat plate. In one embodiment, the second recess portion 38 is a semicircle, and has a radius of curvature R8 of about 2 mm to 15 mm, 4 mm to 10 mm, or 5 mm to 7 mm. In one embodiment, the first recess portion 28 and the second recess portion 38 are formed concurrently.

Figure 10:
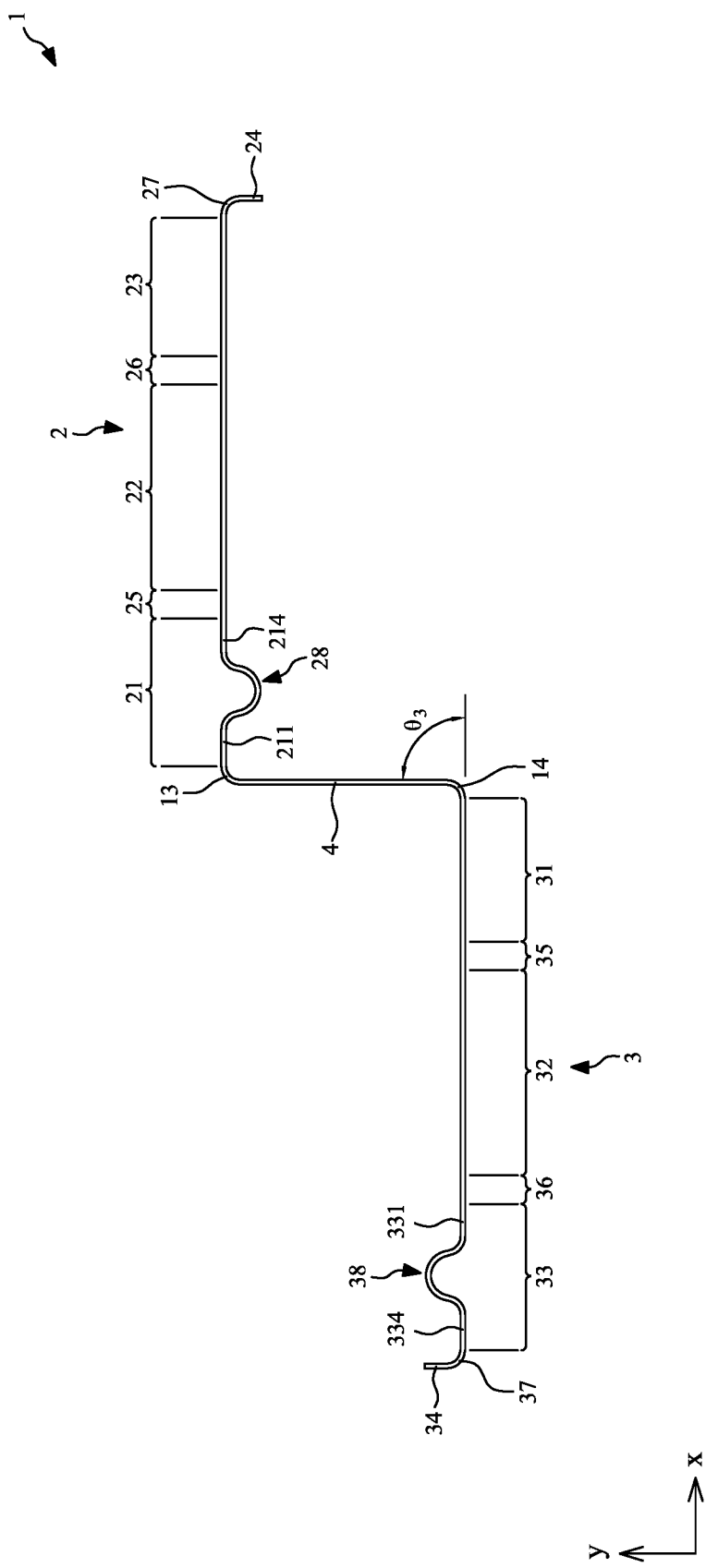
FIG. 10 illustrates one or more stages of an example of a method for manufacturing a reinforcement bar of a vehicle bumper according to some embodiments of the present disclosure.

Then, referring to FIG. 10, the metal plate 1 is fed to pass through another set (or another series) of the forming rollers of the roll forming machine, so as to perform a roll forming process, and form a shape. During the roll forming process, the fifth connecting section 27 is bent so that the first end section 24 is substantially perpendicular to the third plate section 23. During the roll forming process, the eighth connecting section 37 is bent concurrently so that the second end section 34 is substantially perpendicular to the fourth subsection 334 of the sixth plate section 33. In one embodiment, the fifth connecting section 27 and the eighth connecting section 37 are bent concurrently.

Figure 11:
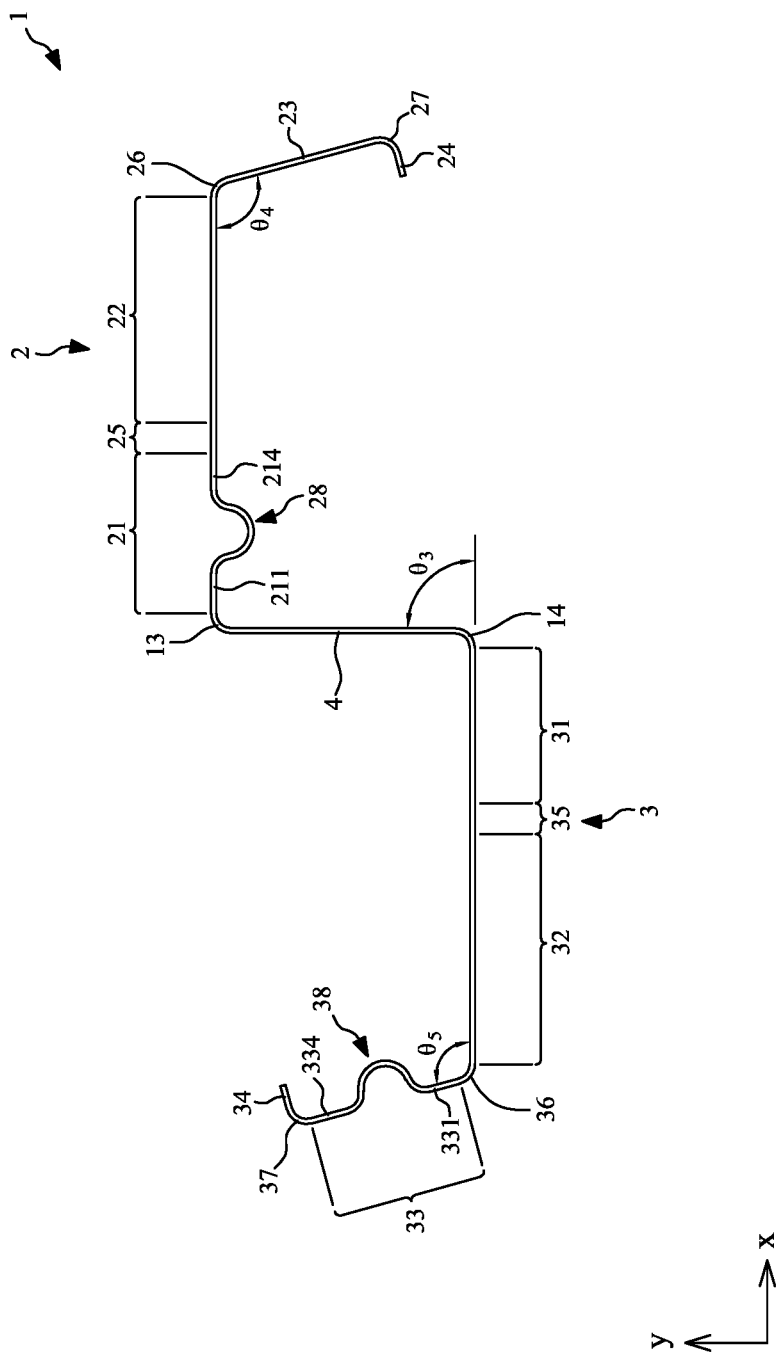
FIG. 11 illustrates one or more stages of an example of a method for manufacturing a reinforcement bar of a vehicle bumper according to some embodiments of the present disclosure.

Then, referring to FIG. 11, the metal plate 1 is fed to pass through another set (or another series) of the forming rollers of the roll forming machine, so as to perform a roll forming process, and form a shape. During the roll forming process, the fourth connecting section 26 is bent so that an included angle $\theta_4$ is formed between the second plate section 22 and the third plate section 23. The included angle $\theta_4$ may be greater than 90 degrees, such as 105 degrees, 110 degrees, or 120 degrees. During the roll forming process, the seventh connecting section 36 is bent concurrently so that an included angle $\theta_5$ is formed between the fifth plate section 32 and the first subsection 331 of the sixth plate section 33. The included angle $\theta_5$ may be greater than 90 degrees, such as 105 degrees, 110 degrees, or 120 degrees. The included angle $\theta_4$ may be equal to or different from the included angle $\theta_5$. In one embodiment, the fourth connecting section 26 and the seventh connecting section 36 are bent concurrently.

Figure 12:
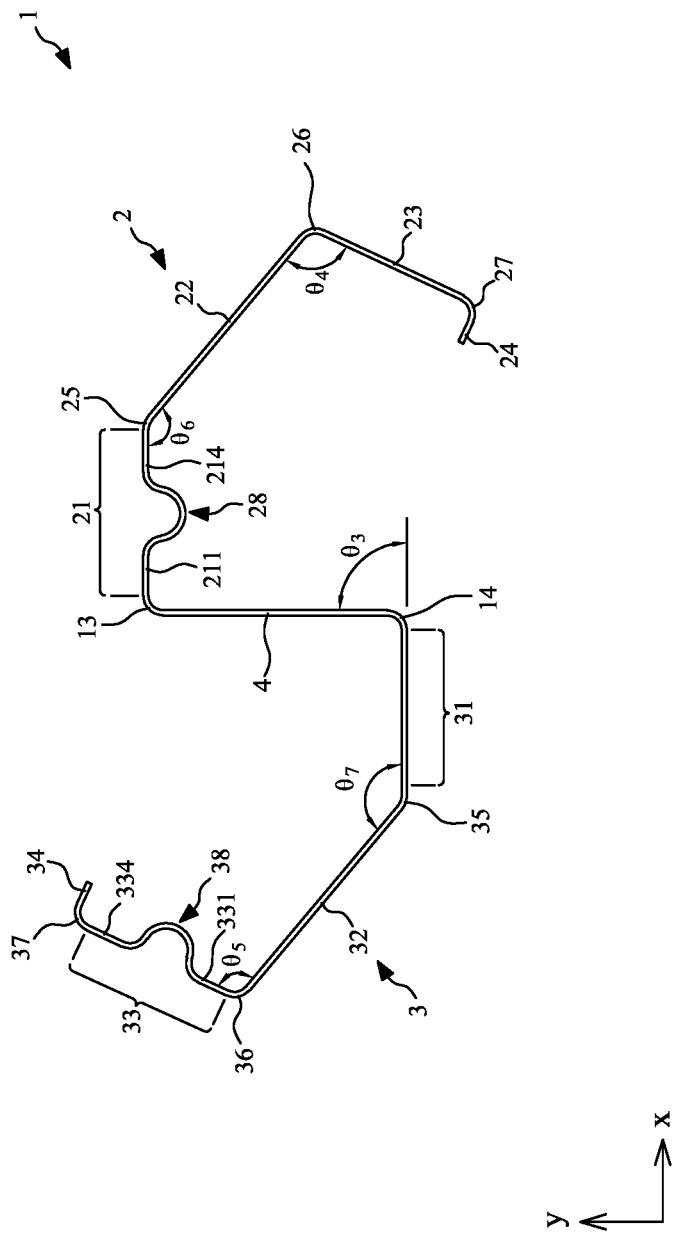
FIG. 12 illustrates one or more stages of an example of a method for manufacturing a reinforcement bar of a vehicle bumper according to some embodiments of the present disclosure.

Then, referring to FIG. 12, the metal plate 1 is fed to pass through another set (or another series) of the forming rollers of the roll forming machine, so as to perform a roll forming process, and form a shape. During the roll forming process, the third connecting section 25 is bent so that an included angle $\theta_6$ is formed between the fourth subsection 214 of the first plate section 21 and the second plate section 22. The included angle $\theta_6$ may be greater than 120 degrees, such as 130 degrees, 140 degrees, or 145 degrees. During the roll forming process, the sixth connecting section 35 is bent concurrently so that an included angle $\theta_7$ is formed between the fourth plate section 31 and the fifth plate section 32. The included angle $\theta_7$ may be greater than 120 degrees, such as 130 degrees, 140 degrees, or 145 degrees. The included angle $\theta_6$ may be equal to or different from the included angle $\theta_7$. In one embodiment, the third connecting section 25 and the sixth connecting section 35 are bent concurrently.

Figure 13:
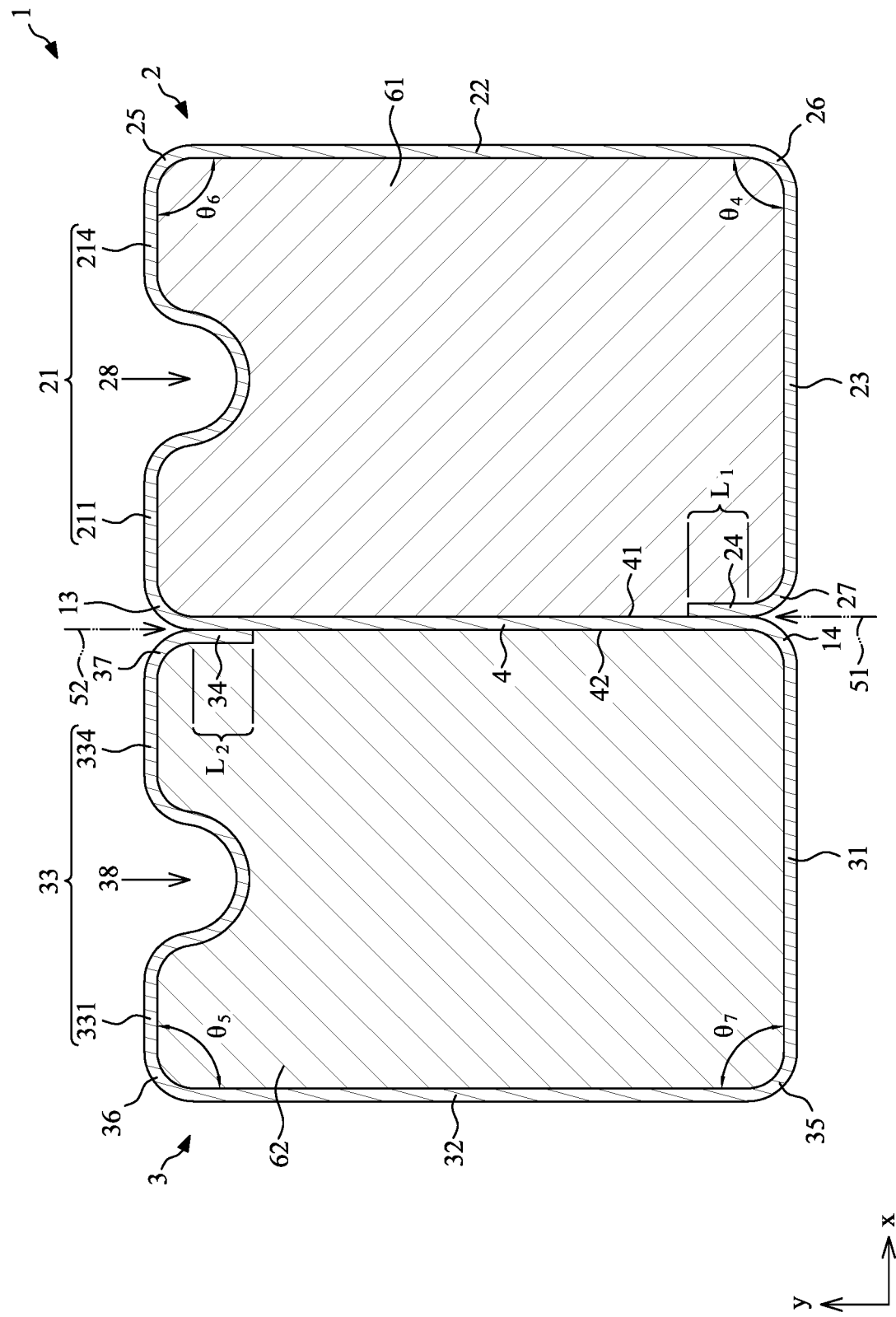
FIG. 13 illustrates one or more stages of an example of a method for manufacturing a reinforcement bar of a vehicle bumper according to some embodiments of the present disclosure.

Then, referring to FIG. 13, the metal plate 1 is fed to pass through another set (or another series) of the forming rollers of the roll forming machine, so as to perform a roll forming process, and form a shape. In one embodiment, a first core shaft 61 and a second core shaft 62 are provided. The first core shaft 61 contacts a first surface 41 of the intermediate portion 4. The first portion 2 is conformally attached to the first core shaft 61. That is, the third connecting section 25 and the fourth connecting section 26 of the first portion 2 are further bent, so that the included angle $\theta_6$ and the included angle $\theta_4$ are substantially equal to 90 degrees. The first end section 24 of the first portion 2 is adjacent to or contacts the first surface 41 of the intermediate portion 4. Meanwhile, the second core shaft 62 contacts a second surface 42 of the intermediate portion 4 opposite to the first surface 41. The second portion 3 is conformally attached to the second core shaft 62. That is, the sixth connecting section 35 and the seventh connecting section 36 of the second portion 3 are further bent, so that the included angle $\theta_7$ and the included angle $\theta_5$ are substantially equal to 90 degrees. The second end section 34 of the second portion 3 is adjacent to or contacts the second surface 42 of the intermediate portion 4.

In some embodiments, there may be a first gap formed between the first end section 24 of the first portion 2 and the first surface 41 of the intermediate portion 4. The first gap may be 0.01 nm to 0.35 nm, 0.01 nm to 0.02 nm, 0.02 nm to 0.30 nm, 0.02 nm to 0.35 nm, 0.01 mm to 0.35 mm, 0.01 mm to 0.02 mm, 0.02 mm to 0.30 mm, or 0.02 mm to 0.35 mm. There may be a second gap formed between the second end section 34 of the second portion 3 and the second surface 42 of the intermediate portion 4. The second gap may be 0.01 nm to 0.35 nm, 0.01 nm to 0.02 nm, 0.02 nm to 0.30 nm, 0.02 nm to 0.35 nm, 0.01 mm to 0.35 mm, 0.01 mm to 0.02 mm, 0.02 mm to 0.30 mm, or 0.02 mm to 0.35 mm.

As shown in FIG. 13, a length $L_1$ of a contact interface between the first end section 24 of the first portion 2 and the first surface 41 of the intermediate portion 4 is a length of the first end section 24, and is 4 mm to 10 mm, 5 mm to 7 mm, or 5.5 mm. A ratio of the length of the first end section 24 to a length of the intermediate portion 4 is ⅕ to ¹/₁₅, or ⅕ to ¹/₁₀. A length $L_2$ of a contact interface between the second end section 34 of the second portion 3 and the second surface 42 of the intermediate portion 4 is a length of the second end section 34, and is 4 mm to 10 mm, 5 mm to 7 mm, or 5.5 mm. A ratio of the length of the second end section 34 to the length of the intermediate portion 4 is ⅕ to ¹/₁₅, or ⅕ to ¹/₁₀. The length $L_1$ may be equal to or different from the length $L_2$.

Then, a first laser 51 is applied or provided to the contact interface between the first end section 24 and the first surface 41 of the intermediate portion 4 or the first gap. Thus, the first end section 24 of the first portion 2 is soldered, fixed, or attached to the first surface 41 of the intermediate portion 4. As a result, the first portion 2 is formed to become a hollow and enclosed tube structure. The direction of propagation of the first laser 51 is substantially perpendicular to the third plate section 23 or the fourth plate section 31. Further, a second laser 52 is applied or provided to the contact interface between the second end section 34 and the second surface 42 of the intermediate portion 4 or the second gap. Thus, the second end section 34 of the second portion 3 is soldered, fixed, or attached to the second surface 42 of the intermediate portion 4. As a result, the second portion 3 is formed to become a hollow and enclosed tube structure. The direction of propagation of the second laser 52 is substantially perpendicular to the first subsection 211 of the first plate section 21 or the fourth subsection 334 of the sixth plate section 33. In one embodiment, the first laser 51 and the second laser 52 may be applied or provided concurrently.

Therefore, the metal plate 1 becomes a formed tube structure. Then, the first core shaft 61 and the second core shaft 62 are removed. Then, a cutting process may be conducted to the formed tube structure to obtain a plurality of reinforcement bars 7 of vehicle bumpers as shown in FIG. 14.

Figure 14:
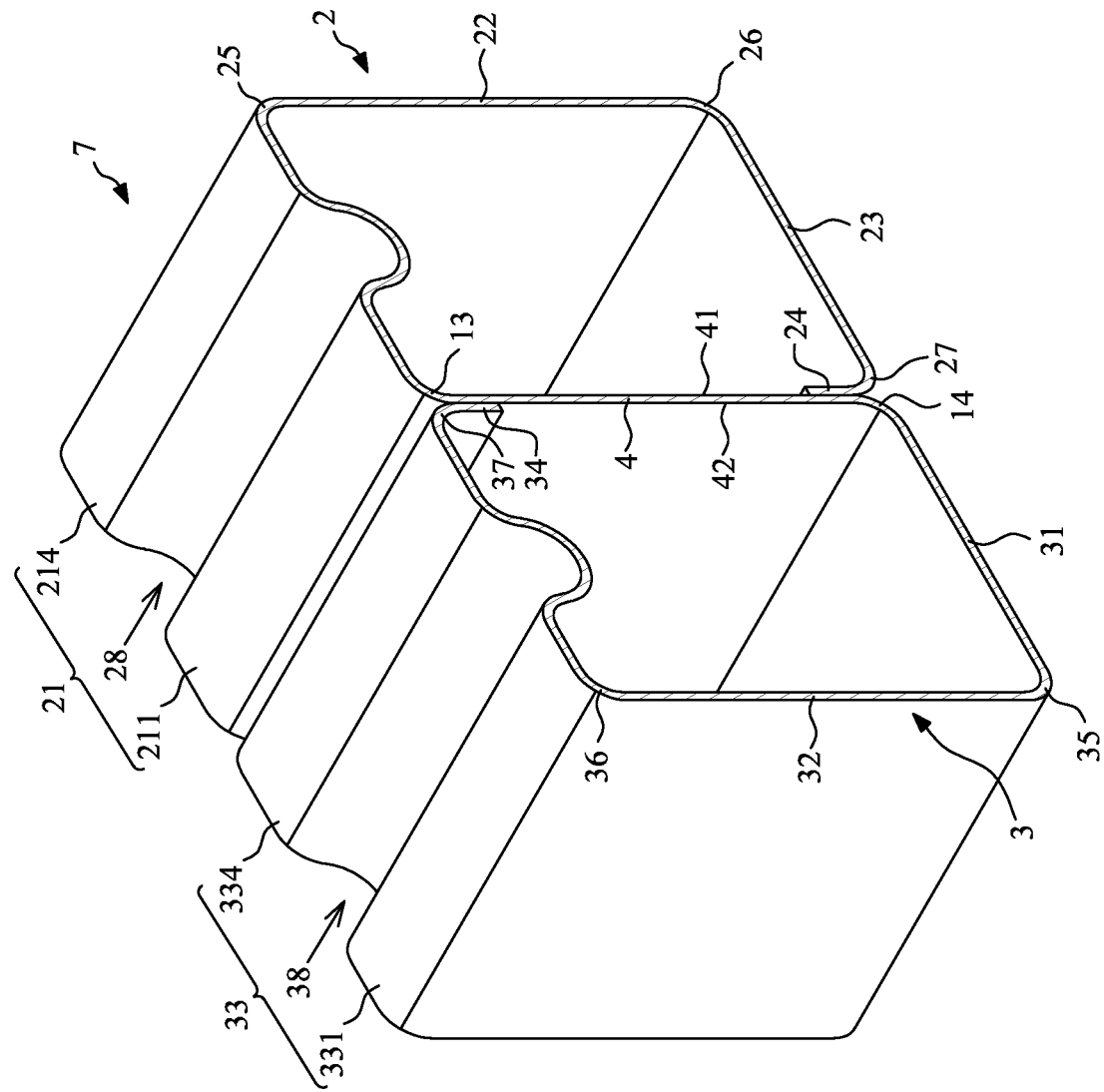
FIG. 14 illustrates a perspective top view of a reinforcement bar of a vehicle bumper according to some embodiments of the present disclosure.

FIG. 14 illustrates a perspective top view of a reinforcement bar 7 of a vehicle bumper according to some embodiments of the present disclosure. The reinforcement bar 7 of a vehicle bumper includes a first portion 2, a first connecting section 13, a second portion 3, a second connecting section 14, and an intermediate portion 4. The first portion 2, the first connecting section 13, the second portion 3, the second connecting section 14, and the intermediate portion 4 of FIG. 14 are the same as the first portion 2, the first connecting section 13, the second portion 3, the second connecting section 14, and the intermediate portion 4 of FIG. 13, respectively.

The first connecting section 13 connects the first portion 2 and the intermediate portion 4. The first portion 2 includes a first plate section 21, a third connecting section 25, a second plate section 22, a fourth connecting section 26, a third plate section 23, a fifth connecting section 27 and a first end section 24. The first plate section 21 includes a first subsection 211, a first recess portion 28, and a fourth subsection 214. The first plate section 21 (including the first subsection 211, the first recess portion 28 and the fourth subsection 214), the third connecting section 25, the second plate section 22, the fourth connecting section 26, the third plate section 23, the fifth connecting section 27 and the first end section 24 of FIG. 14 are the same as the first plate section 21 (including the first subsection 211, the first recess portion 28 and the fourth subsection 214), the third connecting section 25, the second plate section 22, the fourth connecting section 26, the third plate section 23, the fifth connecting section 27 and the first end section 24 of FIG. 13, respectively. The first end section 24 of the first portion 2 is attached to the first surface 41 of the intermediate portion 4, so that the first portion 2 is formed as a hollow and enclosed tube structure.

The second connecting section 14 connects the second portion 3 and the intermediate portion 4. The second portion 3 includes a fourth plate section 31, a sixth connecting section 35, a fifth plate section 32, a seventh connecting section 36, a sixth plate section 33, an eighth connecting section 37 and a second end section 34. The sixth plate section 33 includes a first subsection 331, a second recess portion 38, and a fourth subsection 334. The fourth plate section 31, the sixth connecting section 35, the fifth plate section 32, the seventh connecting section 36, the sixth plate section 33 (including the first subsection 331, the second recess portion 38 and the fourth subsection 334), the eighth connecting section 37 and the second end section 34 of FIG. 14 are the same as the fourth plate section 31, the sixth connecting section 35, the fifth plate section 32, the seventh connecting section 36, the sixth plate section 33 (including the first subsection 331, the second recess portion 38 and the fourth subsection 334), the eighth connecting section 37 and the second end section 34 of FIG. 13, respectively. The second end section 34 of the second portion 3 is attached to the second surface 42 of the intermediate portion 4, so that the second portion 3 is formed as a hollow and enclosed tube structure.

The foregoing embodiments are merely illustrative of the principles and effects of the disclosure, and are not to be construed as limiting the disclosure. Thus, those skilled in the art will appreciate that various modifications and changes can be made to the above embodiments without departing from the spirit of the disclosure. The scope of the disclosure is to be determined by the following claims. Moreover, the scope of the application is not intended to be limited to the particular embodiments described in the specification. A person of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the disclosure.

What is claimed is:

1. A method for manufacturing a reinforcement bar of a vehicle bumper, comprising:
    (a) providing a metal plate, wherein the metal plate includes a first portion, a first connecting section, a second portion, a second connecting section and an intermediate portion, wherein the first connecting section connects the first portion and the intermediate portion, and the second connecting section connects the second portion and the intermediate portion;
    (b) bending the first connecting section, the second connecting section and an entirety of the first portion, wherein the entirety of the first portion is curved and has a single first radius of curvature, and a curvature of the first connecting section is continuous with the curvature of the entirety of first portion;
    (c) releasing an external force acting on the entirety of the first portion, so that the entirety of the first portion springs back;
    (d) bending the first portion and the second portion so that a section of the first portion is adjacent to a first surface of the intermediate portion, and a section of the second portion is adjacent to a second surface of the intermediate portion; and
    (e) attaching the section of the first portion to the first surface of the intermediate portion, and attaching the section of the second portion to the second surface of the intermediate portion.

2. The method according to claim 1, wherein in a cross-sectional view, in the step (a), the metal plate extends along a first direction; wherein in the step (c), the entirety of the first portion springs back to a flat shape, and an extending direction of the entirety of the first portion is parallel with the first direction.

3. The method according to claim 1, wherein in the step (b), the second connecting section is curved and has a radius of curvature, wherein the radius of curvature of the second connecting section is less than the single first radius of curvature of the entirety of the first portion.

4. The method according to claim 1, wherein the step (b) further includes: bending an entirety of the second portion, wherein the entirety of the second portion is curved and has a single second radius of curvature.

5. The method according to claim 4, wherein the step (c) further includes:
   releasing an external force acting on the entirety of the second portion, so that the entirety of the second portion springs back.

6. The method according to claim 1, wherein after the step (c), the method further comprises:
   (c1) bending the first connecting section, the second connecting section and the entirety of the first portion, wherein the entirety of the first portion is curved and has a single third radius of curvature; and
   (c2) releasing a second external force acting on the entirety of the first portion, so that the entirety of the first portion springs back.

7. The method according to claim 6, wherein the third radius of curvature is different from the first radius of curvature.

8. The method according to claim 1, wherein in the step (b), a center of curvature of the entirety of the first portion is located at a position on a same side with the intermediate portion.

9. The method according to claim 1, wherein after the step (c), the method further comprises:
   (c1) repeating the step (b) and the step (c) several times, so that each of the entirety of the first portion, the entirety of the second portion and the intermediate portion is in a flat shape, wherein the entirety of the first portion is parallel with the entirety of the second portion, the entirety of the first portion is perpendicular to the intermediate portion, and the entirety of the second portion is perpendicular to the intermediate portion;
   wherein the step (d) includes: bending at least one section of the first portion to form a first recess portion; and bending a second at least one section of the second portion to form a second recess portion.

10. The method according to claim 1, wherein in the step (d), a length of the section of the first portion is in a range from 4 mm to 10 mm, and a length of the section of the second portion is in a range from 4 mm to 10 mm.

* * * * *